United States Patent [19]

Nakagawa et al.

[11] Patent Number: 4,808,782
[45] Date of Patent: Feb. 28, 1989

[54] MICROWAVE IRRADIATING STERILIZATION PROCESS

[75] Inventors: Yoshihiro Nakagawa; Takeo Tomatsuri; Ikuo Ozaki; Kiichiro Hirose; Yukie Sato; Tamami Ohzeki, all of Tokyo, Japan

[73] Assignee: Toppan Printing Co., Ltd., Japan

[21] Appl. No.: 122,788

[22] Filed: Nov. 19, 1987

[30] Foreign Application Priority Data

Nov. 26, 1986 [JP] Japan .................... 61-281484
Dec. 29, 1986 [JP] Japan .................... 61-203237[U]
Mar. 12, 1987 [JP] Japan .................... 62-57442
Sep. 29, 1987 [JP] Japan .................... 62-244566

[51] Int. Cl.$^4$ .................... H05B 6/78; G01N 33/02
[52] U.S. Cl. .................... 219/10.55 M; 219/10.55 A; 426/235; 426/241
[58] Field of Search ............. 219/10.55 M, 10.55 A, 219/10.55 R, 10.55 E, 10.55 F; 84/1; 426/233, 234, 241, 243

[56] References Cited

U.S. PATENT DOCUMENTS

| | | | |
|---|---|---|---|
| 2,820,127 | 1/1958 | Argento et al. | 219/10.55 E |
| 3,551,090 | 12/1970 | Brumfield et al. | 219/10.55 E |
| 4,246,462 | 1/1981 | Meisel | 219/10.55 A |
| 4,405,850 | 9/1983 | Edgar | 219/10.55 A |
| 4,468,865 | 9/1984 | Inagaki | 219/10.55 R X |
| 4,624,854 | 11/1986 | Naumann et al. | 219/10.55 M X |
| 4,687,895 | 8/1987 | Chitre et al. | 219/10.55 A |

Primary Examiner—Philip H. Leung
Attorney, Agent, or Firm—Lerner, David, Littenberg, Krumholz & Mentlik

[57] ABSTRACT

A process for sterilizing a material contained in a sealed microwave permeable package which is stored, under normal pressure, in a heat resisting and pressure resisting support during microwave irradiation. The heat resisting and pressure resisting support is conveyed on a conveyor belt into a plurality of microwave heating chambers in which local heating waveguides are provided in close proximity to the heat resisting and pressure resisting support and overall heating waveguides are provided at the wall of the microwave heating chambers. The heat resisting and pressure resisting support with the package is alternately irradiated by the local heating waveguides and the overally heating waveguides during conveyance through the microwave heating chambers so as to effect the substantially uniform heating of the material in the package. To regulate the degree to which the peripheral portions of the package are heated, the distance between the local heating waveguides and the package can be adjusted. To further facilitate the substantially uniform heating of the material in the package, the heat resisting and pressure resisting support containing the package can be inverted during conveyance.

14 Claims, 3 Drawing Sheets

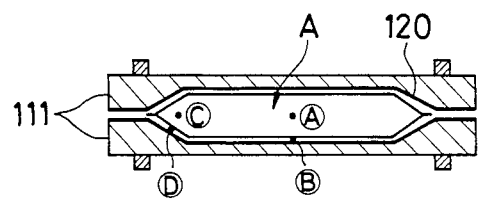
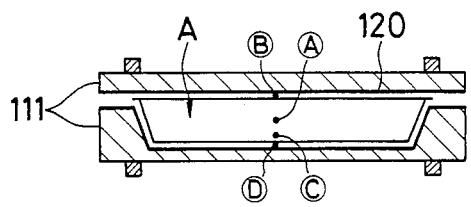
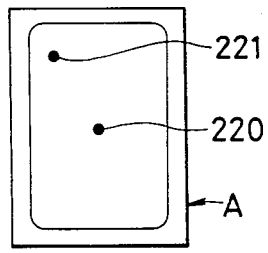
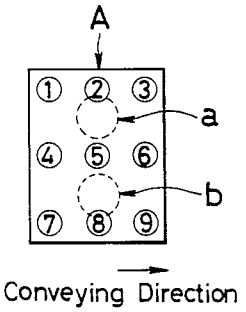
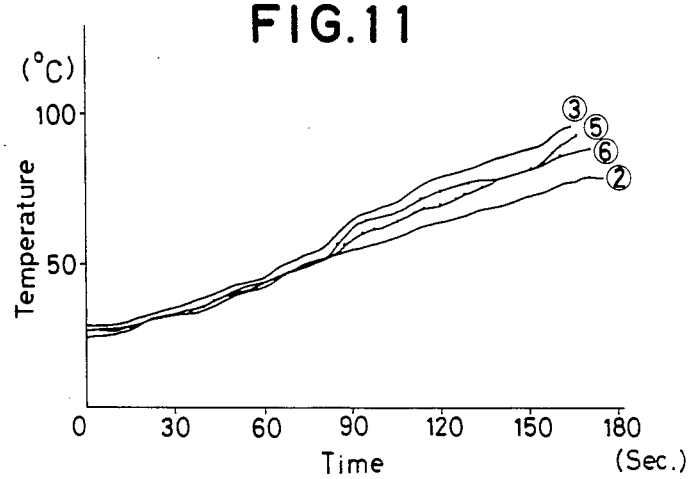

MICROWAVE IRRADIATING STERILIZATION PROCESS

TECHNICAL FIELD

This invention relates to a microwave irradiating sterilization process under normal pressures, and particularly to a microwave irradiating sterilization process in which a temperature difference between the central portion and its surrounding portion in a package containing food to be sterilized is reduced in the case when the package is irradiated with microwave, whereby the food can be positively sterilized.

PRIOR ART

At present, foods are sterilized in accordance with retortable sterilizing process in order to distribute sealed food packages for long-term preservation at ordinary temperatures. In this respect, the sterilization is performed by utilizing a heating medium having a temperature of 100° C. or more under pressure. In this case, however, an extremely long period of time such as 15–60 minutes at 120° C. is required for satisfying a prescribed sterilizing condition dependent upon the properties of food (particularly one containing solid matters) to be packaged, because heat for the sterilization which reaches the center of the food is principally determined by heat conduction of the food. For this reason, a packaging material as well as food are exposed to a high temperature for a long period of time, and as a result a packaging material of high quality and high cost is required in this case, besides there is the most significant disadvantage which is the damage in touch in eating, taste, color and the like of the food.

Furthermore, in these retortable sterilizing processes, high-degree skill was required for the pressure regulation for preventing a package from burst thereof, since the sterilization is conducted under pressure in the processes.

In place of such retortable sterilizing process, another sterilizing process in which the heating can be attained by means of microwave for a short period of time is noticed, and such a sterilizing process wherein the sterilization is conducted by irradiating microwave under pressure as in the case of retortable sterilizing process has been presented from the U.S. Army Research Institute. However, since this process is one in which microwave is irradiated under pressure, the pressure regulation therefor is difficult as in retortable sterilizing process, besides the sterilizer therefor becomes complicated and expensive, so that it was difficult to generally use the process.

As another sterilizing process utilizing microwave, a process in which packages containing foods to be sterilized are placed in a supporting holder made from a microwave permeable material, and microwave is irradiated from the outside of the supporting holder thereby to sterilize the foods has been proposed as disclosed in Japanese Patent Publication No. 26949/1983. According to this process, while the sterilization can be effected by placing packages in a supporting holder and irradiating the packages with microwave, the process involves such disadvantages that there arises unevenness in heating, and remarkable scorched foods are observed particularly in the case where foods of a low moisture content are sterilized.

Furthermore, with respect to temperatures in case of sterilization of a package, there is such a tendency that a temperature at the surrounding portion of center is higher than that of the central portion in the package, whilst a temperature of the fringe thereof is further lower than the portions mentioned above. Particularly, such tendency is remarkable in the case where foods which have been contained in packages are solid matters or highly viscous products wherein no convection is observed. Thus, in practical sterilization, excessively heated condition is generated in a portion surrounding the central portion in a package, whilst an insufficiently heated condition is produced in the central portion and the fringe of the package, whereby an adverse effect has been observed from viewpoint of quality of the foods.

On one hand, when a package which is contained in a supporting holder made of a microwave permeable material is irradiated with microwave, a temperature in the fringe of the package becomes particularly lower than those of the other portions, because of its small thermal capacity, heat transfer from a portion being in contact with the supporting holder and heat release from a clearance in the supporting holder.

SUMMARY OF THE INVENTION

It is an object of the present invention to provide a microwave irradiating sterilization process under normal pressures by which a material to be sterilized can be sterilized for a short period of time which is a characteristic feature of microwave irradiating sterilization, and further by which temperature differences among respective portions in a package can be minimized, as a matter of course, at the time when irradiation (sterilization) of a material to be sterilized in the package with microwave is completed, besides differences in temperature elevation among the respective portions can be minimized in also the course of sterilization.

The present invention relates to a microwave irradiating sterilization process characterized by repeating such local heating that portions of a package where temperature rise are poor are irradiated with microwave by the use of waveguides for local heating being close to the package, or further irradiating the whole package with microwave by the use of waveguides for overall heating in the case when packages each of which is one wherein food to be sterilized is contained in a tray or a pouch made of a microwave permeable material are subjected to heating sterilization by irradiating the packages with microwave while continuously conveying them.

Furthermore, the present invention relates to a microwave irradiating sterilization process wherein packages are contained in supporting holders in case of microwave irradiation, and the packages thus contained are subjected to microwave irradiation as described in the former sterilization process.

BRIEF DESCRIPTION OF THE DRAWINGS

FIGS. 8(a) and (b) are sectional views each showing another example of supporting holder;

FIG. 9 is an explanatory view indicating positions at which temperatures of packages are measured in Examples 1 and 2, respectively;

FIG. 10 is an explanatory view indicating positions at which temperatures of packages are measured in Example 3; and FIG. 11 is a graphical representation indicating results of the temperatures measured in Example 3.

DETAILED DESCRIPTION OF THE INVENTION

Figure 1:
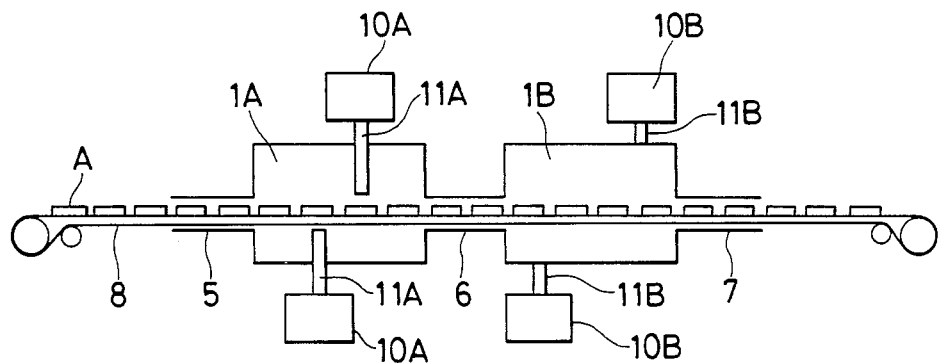
FIG. 1 to FIG. 4 are explanatory views each illustrating an example of the sterilizing apparatus used for the microwave irradiating sterilization process according to the present invention.

First of all, an apparatus used for the microwave irradiating sterilization process according to the present invention is constructed in, for example, such that a first heating chamber 1A in which microwaves are irradiated from microwave generators 10A, through waveguides 11A, for local heating and a second heating chamber 1B in which microwaves are irradiated from microwave generators 10B through waveguides 11B for overall heating are disposed on a conveying route of packages A, respectively, as shown in FIG. 1. Each of the waveguides 11A, 11A in the first heating chamber 1A extends to a position being close to the conveying route of packages, whilst each of the waveguides 11B in the second heating chamber 1B is positioned at a wall portion thereof.

Packages A are supplied to a conveyor 8, conveyed to the first heating chamber 1A through a microwave trap 5, and a material to be sterilized in each of the packages A is partially heated in said first heating chamber. Then, each of the packages A passes through a microwave trap 6, the whole of such a package A is heated in the second heating chamber 1B, and each of the packages thus sterilized passes again through a microwave trap 7 to be taken out.

In this case, a distance defined between a microwave irradiating mouth of each of the waveguides 11A and a package in the first heating chamber 1A may be adjusted by travelling the waveguide within a range of 10-100 mm, and a dimension of the irradiation mouth of such a waveguide 11A may be regulated by varying a dimension of a slit defined on the irradiation mouth.

Figure 2:
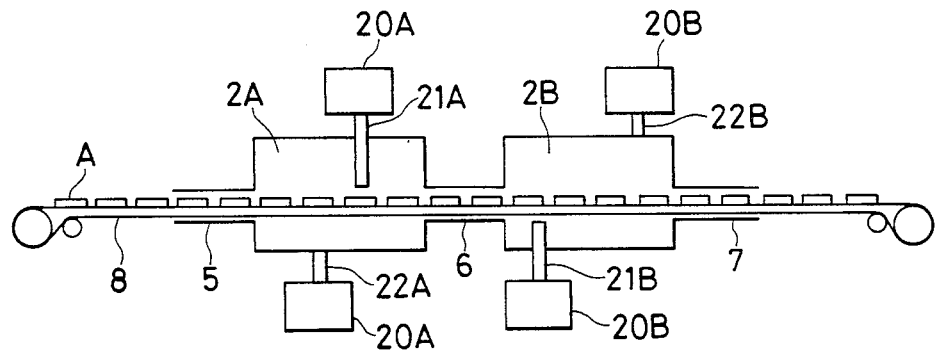

Referring to FIG. 2, a first heating chamber 2A in which microwaves are irradiated from microwave generators 20A through waveguides 21A and 22A and a second heating chamber 2B in which microwaves are irradiated from microwave generators 20B through waveguides 21B and 22B are disposed on a conveying route of packages A, respectively in an apparatus used for the sterilization according to the present invention. The waveguide 21A for local heating in the first heating chamber 2A extends to a position being close to the conveying route of packages, whilst the lower waveguide 22A for overall heating is positioned at a wall portion thereof. Furthermore, the waveguide 22B for overall heating is positioned at a wall portion of the second heating chamber 2B and the lower waveguide 21B for local heating extends to a position being close to the conveying route of packages in the second heating chamber 2B.

Packages A are supplied to a conveyor 8, conveyed to the first heating chamber 2A through a microwave trap 5, and a material to be sterilized in each of the packages A is heated partially from the upper side and entirely from the under side in said first heating chamber. Then, each of the packages A passes through a microwave trap 6, such a package A is heated partially from the under side and entirely from the upper side in the second heating chamber 2B, and each of the packages thus sterilized passes again through a microwave trap 7 to be taken out.

Figure 3:
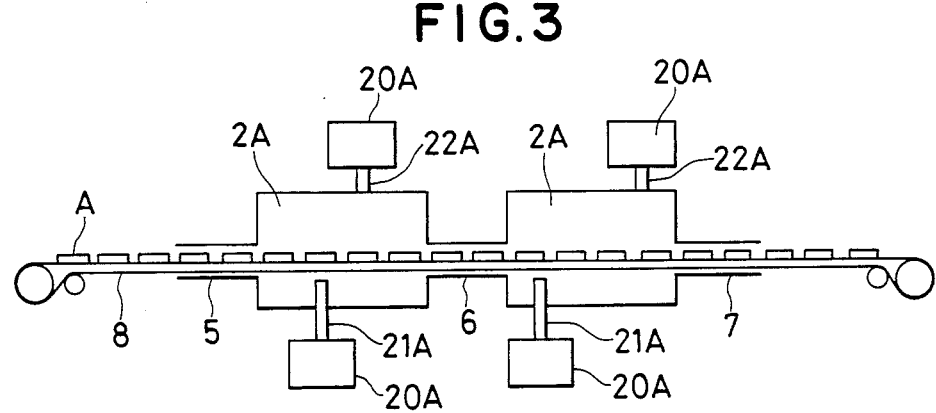

Furthermore, two or more of constructions of the second heating chamber may be repeated as shown in FIG. 3.

In this case, local heating as well as overall heating of packages A may be effected by reversing the order of heating with respect to the top and bottom of each of the packages in heating chambers 2A and 2B.

The number of heating chambers is not limited to two, but packages may be heated with repeated constructions of a pair of the aforesaid two heating chambers, if necessary.

Figure 4:
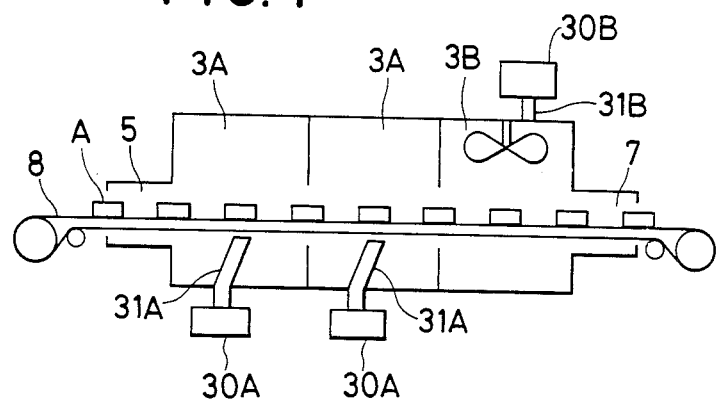

Referring to FIG. 4, each of first heating parts 3A in which microwaves are irradiated from microwave generators 30A through local heating waveguides 31A and a second heating part 3B in which microwave is irradiated from a microwave generators 30B through an overall heating waveguide 31B are disposed on a conveying route of packages A, respectively, in an apparatus used for the microwave irradiating sterilization according to the present invention. Each of the waveguides 31A in the first heating parts 3A extends to a position being close to the conveying route of packages, whilst the waveguide 31B in the second heating part 3B is positioned at a wall portion thereof.

Figure 6:
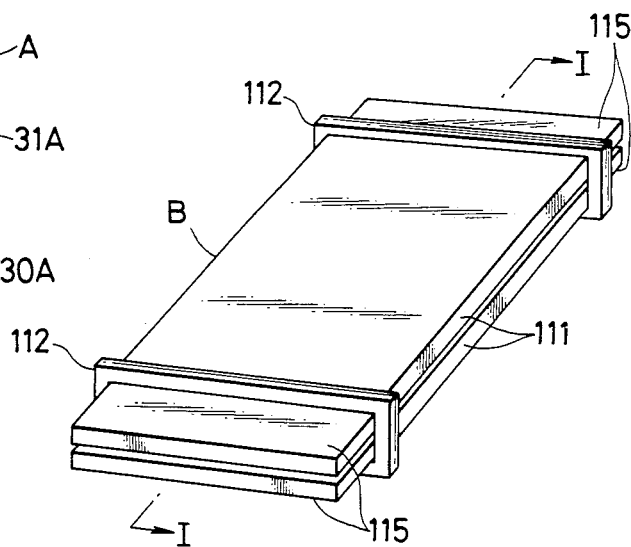
FIG. 6 is a perspective view showing an example of supporting holder.

Supporting holders B, shown in FIG. 6 containing packages A, respectively, are supplied to a conveyor 8, conveyed to the first heating parts 3A through a microwave trap 5, and a material to be sterilized in each of the packages A is heated partially in these first heating parts 3A and then, entirely in said second heating part 3B. Then, each of the packages A thus sterilized passes again through a microwave trap 7 to be taken out.

In this case, a distance defined between a microwave irradiation port of each of the waveguides 31A and a package in each of the first heating parts 3A may be adjusted by travelling the waveguide within a range of 10-100 mm, and a dimension of the irradiation mouth of such a waveguide 31A may be regulated by varying a dimension of a slit defined on the irradiation mouth.

Figure 5:
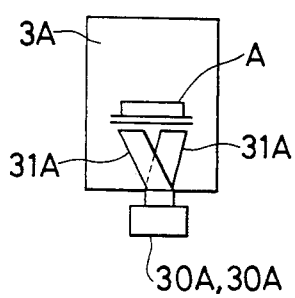
FIG. 5 is an explanatory view showing a state of waveguides in the first heating chamber in the sterilizing apparatus of FIG. 4.

The waveguides 31A of the first heating parts 3A are constructed in such that positions which are opposite to each other in the direction perpendicular to that along which packages are conveyed at an equal distance therefrom are irradiated by these waveguides, respectively, as shown in FIG. 5.

In order that a package A is partially heated by means of a local heating waveguide extending to a position close to a route for conveying packages, it is desirable that such a package A is intermittently conveyed and stopped so as to locate it immediately over the waveguide.

While all the above explanations have been made in respect of microwave irradiating sterilization in which local heating waveguides as well as overall heating waveguides are employed, objects of the present invention can be attained by the use of local heating waveguides only.

For example, a plurality of local heating waveguides are placed at different positions in the direction perpendicular to that along which packages are conveyed, conveying packages are irradiated with microwave from the waveguides disposed at said positions under these packages, and so irradiated packages are further turned over at the intermediate stage of heating, whereby the packages can be uniformly heated.

Furthermore, a plurality of local heating waveguides are disposed on both the upper and lower sides of a route for conveying packages, and these packages may be irradiated with microwave at different positions in the direction perpendicular to that along which the packages are conveyed as in the case mentioned above. In this case, it becomes possible to more uniformly heat these packages by turning over them at the intermediate stage of such heating.

Moreover, it is effective to irradiate merely upwardly a material to be sterilized in a package with microwave in a first heating chamber in the case where such material to be sterilized is liquid food exhibiting flow behavior such as soup, stew and the like, whilst it is effective for solid food such as Hamburg steak, steak, roast fish and the like to irradiate such solid food not only upwardly, but also downwardly with microwave.

In addition, when packages or supporting holders containing such packages are reversed at an overall heating position, a temperature difference between the upper and lower portions inside each package decreases, so that more uniform heating becomes possible.

A volumetric capacity of a heating chamber provided with said overall heating waveguides is 0.05–0.5 m³, and a plurality of such heating chambers are disposed through each trap or partition panel to obtain a unit construction.

Since a capacity of the heating chamber ranges from 0.05 m³ to 0.5 m³, a microwave distribution in the heating chamber becomes substantially uniform, and as a result the whole of each package can be homogeneously and stably heated.

In the case where a capacity of the heating chamber is less than 0.05 m³, since a microwave energy density is high, packages are rapidly heated so that there is a dangerous situation where temperature scattering becomes remarkable in each of such packages, besides it becomes difficult to control the heating temperature.

On the other hand, when a capacity of the heating chamber is more than 0.5 m³, the heating chamber is too large and microwave does not sufficiently diffuse therein, so that a distribution of microwave becomes nonuniform in the heating chamber and the heating is not homogeneously carried out.

A profile of such heating chamber is preferably a substantially cubical shape, because a plurality of packages are present in the respective heating chambers and these packages must be homogeneously irradiated with microwave.

Sterilization which is effected by passing said packages A through a sterilizer is made after containing the packages in supporting holders each of which is made of a microwave permeable material in order to prevent these packages from bursts thereof.

Figure 7:
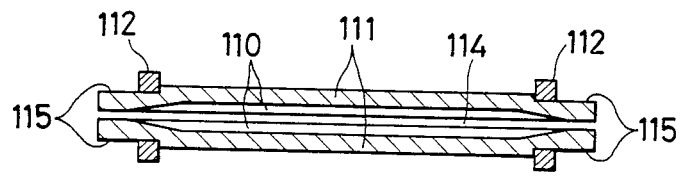
FIG. 7 is a sectional view taken along the line I—I of FIG. 6.

As a supporting holder, there is a member made of a microwave permeable material which comprises two holding plates 111 forming a containing portion 110 therein, and lock portions 115 located on the opposite ends of these holding plates being clamped by ring-shaped retaining members 112 as shown in FIGS. 6 and 7.

The retaining member 112 is constructed so as to have a larger spacing by 0.5–3 mm than the total thickness of either side of both the respective ends of the holding plates 111, and the respective ends of the holding plates 111 are inserted into said spacing to attain a clamp condition.

If a difference between a dimension of the spacing in the retaining member 112 and the total thickness of the holding plates 111 is less than 0.5 mm, it is difficult to clamp the holding plates by means of the retaining member and to take out a package after heating.

In contrast to the above, when such a difference exceeds 3 mm, it becomes easy to clamp the holding plates by the retaining member and to take out a package after heating, however there exists a dangerous situation where the retaining member is disengaged from the holding plates at the time of heating or the package bursts.

Furthermore, preferable is to use such supporting holders each of which is constructed in such that a heating element 120 is disposed on a holding plate 111 which is in contact with a package A as shown in FIGS. 8(a) and (b) in order to prevent heat release from portions where the package A is in contact with the holding plates 111.

A material used for the holding plates in said supporting holder is one having heat resistance and a certain bending strength, and an example of which includes, for example, glass filler-filled silicone, glass filler-filled polyphenylenesulfide, and silicone impregnated glass-cloth laminate.

The retaining member 112 for clamping these supporting holders 111 is made from a microwave permeable material, e.g. such as glass filler-filled epoxy resin having heat resistance and such a strength which withstands internal pressure of a package.

As the heating element 120 for disposing onto the supporting plates 111, a material which generates heat with irradiation of microwave, for example, ferrite mixed rubber, ferrite mixed resin, or aluminum metalized film may be employed. A temperature to be generated can be adjusted by selecting a type or a mixing ratio of ferrite in the case where ferrite is used for the heating element and by changing a thickness of a metalized layer or a thickness of a film on which aluminum is metalized in the case where an aluminum metalized film is utilized as the heating element.

EXAMPLE 1

Two microwave oscillators (SMG-130 manufactured by Sanyo Denki K.K.) each having 1.3 KW output were placed in a first heating chamber 1A and a second heating chamber 1B as their microwave generators, respectively, in a microwave sterilizing apparatus shown in FIG. 1.

In the above case, two local heating waveguides 11A in the first heating chamber 1A were positioned in such that an irradiation mouth of each of the local heating waveguides 11A extended to be close to a package, whilst two overall heating waveguides 11B in the second heating chamber 1B were positioned in such that an irradiation mouth of each of the overall heating waveguides 11B did not project from a wall surface of the heating chamber.

Conveyance of packages was continuously or intermittently carried out, and the following materials to be sterilized were tested.

The materials to be sterilized were water, carboxymethylcellulose (hereinafter referred to simply as "CMC") aqueous solution A (1.2% concentration, and 4,000 cps viscosity), CMC aqueous solution B (2.5% concentration, and 64,000 cps viscosity), and konjak (jelly-like food made from the starch of the devil's-tongue).

A package prepared by charging a pouch made of an oriented nylon/non-oriented polypropylene laminated film with 130 g each of said materials to be sterilized was used to effect heating sterilization.

At a preset temperature of 100° C. or more, a package was contained in a supporting holder made from glass-filled silicone resin and subjected to heat treatment.

Temperatures were measured by means of a thermocouple at a central portion 222 and its surrounding portion 221 as shown in FIG. 9.

Conditions for continuous and intermittent conveyance are shown in Tables 1 and 2, respectively. In either case of conveyance, four packages were adapted to be present in the first and second heating chambers 1A and 1B, respectively.

TABLE 1

| Conditions | | 1 | 2 | 3 |
|---|---|---|---|---|
| 1st Heat. Chamber | Output (KW) | 2.6 | 2.6 | 0 |
| | Time (sec) | 45 | 70 | 0 |
| 2nd Heat. Chamber | Output (KW) | 2.6 | 2.6 | 2.6 |
| | Time (sec) | 45 | 70 | 135 |
| Supporting Holder | | no | yes | yes |

*Distance between irradiation mouth of first heating part and package: 35 mm
Slit width of irradiation mouth: 30 mm

TABLE 2

| Conditions | 4 | 5 | 6 | 7 | 8 |
|---|---|---|---|---|---|
| 1st H.C. Output (KW) | 2.6 | 2.6 | 2.6 | 2.6 | 2.6 |
| 2nd H.C. Output (KW) | 2.6 | 2.6 | 2.6 | 2.6 | 2.6 |
| Stopping Period (sec) | 5 | 5 | 5 | 5 | 12 |
| Distance (mm) | 35 | 35 | 100 | 35 | 35 |
| Slit Width (mm) | 30 | 50 | 30 | 30 | 30 |
| Number of Times | 1 | 1 | 1 | 2 | 1 |
| Supporting Holder | no | no | no | yes | yes |

*H.C.: Heating Chamber

In case of continuous conveyance, a surrounding portion of each package was more remarkably heated than its central portion thereof irrespective of materials to be sterilized in also the first heating chamber. After completing the second heating, the temperature difference increased further, so that no effect was observed in respect of direct irradiation. In case of water, however, a temperature difference is small as compared with that in case of the other materials to be sterilized, and accordingly influence of convection was observed. In any condition, CMC aqueous solution and konjak had substantially the same tendencies, so that results of the temperature measurement in 1.2% CMC aqueous solution were shown in Table 3.

TABLE 3

| | Heating Temperature | | | | Final T.Diff. |
|---|---|---|---|---|---|
| | After 1st Heating | | After 2nd Heating | | |
| | Cent.P. | Surrd.P. | Cent.P. | Surrd.P. | * |
| Conditions | (°C.) | (°C.) | (°C.) | (°C.) | (°C.) |
| 1 | 53 | 59 | 81 | 97 | +16 |
| 2 | 68 | 79 | 114 | 138 | +24 |
| 3 | 19 | 19 | 108 | 139 | +31 |
| 4 | 61 | 37 | 86 | 73 | −13 |
| 5 | 56 | 43 | 80 | 81 | +1 |
| 6 | 46 | 52 | 72 | 88 | +16 |
| 7 (once) | 60 | 39 | 84 | 73 | −11 |
| (twice) | 119 | 99 | 142 | 135 | −7 |
| 8 | 95 | 51 | 136 | 113 | −23 |

*Temperature at surrounding portion with respect to central portion of package
Cent.P.: Central Portion
Surrd.P.: Surrounding Portion
T.Diff.: Temperature Difference

EXAMPLE 2

Sterilization was carried out as described hereinbelow by employing the same microwave oscillators with those used in Example 1 for the sterilizing apparatus shown in FIG. 2.

In the above case, a local heating waveguide 21A in two of them in the first heating chamber 2A was positioned in such that an irradiation mouth of the local heating waveguide 21A extended to be close to a package, whilst the other overall heating waveguide 22A was located in such that an irradiation mouth of the overall heating waveguide 22A did not project from a wall surface of the heating chamber. Furthermore, a waveguide 22B in two of them in the second heating chamber 2B was positioned in such that it did not project from a wall surface of the heating chamber, whilst the other waveguide 21B was disposed as in the case of the waveguide 21A in the first heating chamber.

Conveyance of packages was continuously or intermittently carried out, and the following materials to be sterilized were tested.

The materials to be sterilized were water, CMC aqueous solution A (1.2% concentration, and 4,000 cps viscosity), CMC aqueous solution B (2.5% concentration, and 64,000 cps viscosity), and konjak.

A package prepared by charging a pouch made of an oriented nylon/non-oriented polypropylene laminated film with 130 g each of said materials to be sterilized was used to effect heating sterilization.

At a preset temperature of 100° C. or more, a package was contained in a supporting holder made from glass-filled silicone resin and subjected to heat treatment.

Temperatures were measured as in the case of Example 1 by means of a thermocouple at a central portion 222 and its surrounding portion 221 as shown in FIG. 9.

Conditions for continuous and intermittent conveyance are shown in Tables 4 and 5, respectively. In either case of conveyance, four packages were adapted to be present in the first and second heating chambers 2A and 2B, respectively.

TABLE 4

| Conditions | | 1 | 2 |
|---|---|---|---|
| 1st Heating Chamber | Output (KW) | 2.6 | 2.6 |
| | Time (sec) | 45 | 70 |
| 2nd Heating Chamber | Output (KW) | 2.6 | 2.6 |
| | Time (sec) | 45 | 70 |
| Supporting Holder | | no | yes |

*Distance between irradiation mouth of first heating part and package: 35 mm
Slit width of irradiation mouth: 30 mm

TABLE 5

| Conditions | 3 | 4 | 5 | 6 | 7 |
|---|---|---|---|---|---|
| 1st H.C. Output (KW) | 2.6 | 2.6 | 2.6 | 2.6 | 2.6 |
| 2nd H.C. Output (KW) | 2.6 | 2.6 | 2.6 | 2.6 | 2.6 |
| Stopping Period (sec) | 5 | 5 | 5 | 5 | 12 |
| Distance (mm) | 35 | 35 | 50 | 35 | 35 |

TABLE 5-continued

| Conditions | 3 | 4 | 5 | 6 | 7 |
|---|---|---|---|---|---|
| Slit Width (mm) | 30 | 50 | 30 | 30 | 30 |
| Number of Times | 1 | 1 | 1 | 2 | 1 |
| Supporting Holder | no | no | no | yes | yes |

In case of continuous conveyance, a surrounding portion of each package was more remarkably heated than its central portion thereof irrespective of materials to be sterilized in also the first heating chamber. After completing the second heating, the temperature difference increased further, so that no effect was observed in respect of direct irradiation. In case of water, however, a temperature difference is small as compared with that in case of the other materials to be sterilized, and accordingly influence of convection was observed. In any condition, CMC aqueous solution and konjak had substantially the same tendencies, so that results of the temperature measurement in 1.2% CMC aqueous solution were shown in Table 6.

TABLE 6

| | Heating Temperature | | | | |
|---|---|---|---|---|---|
| | After 1st Heating | | After 2nd Heating | | Final T.Diff. |
| Conditions | Cent.P. (°C.) | Surrd.P. | Cent.P. (°C.) | Surrd.P. | * (°C.) |
| 1 | 50 | 58 | 82 | 96 | +14 |
| 2 | 68 | 79 | 114 | 138 | +24 |
| 3 | 53 | 48 | 85 | 76 | −13 |
| 4 | 49 | 52 | 80 | 82 | +2 |
| 5 | 48 | 54 | 74 | 85 | +11 |
| 6 (once) | 52 | 48 | 84 | 74 | −10 |
| (twice) | 111 | 103 | 140 | 134 | −6 |
| 7 | 75 | 70 | 128 | 120 | −8 |

*Temperature at surrounding portion with respect to central portion of package

From the results shown in Table 6, it was found that direct irradiation of package A with microwave in the first heating chamber or the second heating chamber was effective for heating in a central portion of the package in case of intermittent conveyance therefor. The advantageous effects thereof are dependent upon a distance between irradiation mouth and material to be sterilized, a size of the irradiation mouth, and a period for heating, and thus substantially uniform heating becomes possible by combining these factors so as to be in conformity with the shape of a package.

EXAMPLE 3

Sterilization was carried out as described hereinbelow by employing the sterilizing apparatus shown in FIGS. 3 and 4 provided with the same microwave oscillators with those used in Example 1.

In the sterilizing apparatus, local heating waveguides 31A, 31A were disposed in first heating parts 3A, 3A in such that each irradiation mouth of the waveguides having a slit width of 28 mm×59 mm was extended to have a gap of 30 mm with respect to a package and these waveguides were placed so as to offset by 35 mm each along a transverse direction from the centerline in the conveying direction of packages, whilst an overall heating waveguide 31B was disposed in a second heating part 3B in such that the overall heating waveguide did not project from a wall surface of the heating chamber.

In the above arrangement, supporting holders each containing a package were intermittently conveyed so as to travel for 2 seconds and then to stop for 4 seconds. It is to be noted that portions a and b indicated in FIG. 10 were alternately irradiated with microwave by means of the waveguides 31A, 31A in the first heating parts 3A, 3A.

Sterilization was effected on CMC aqueous solution A (1.2% concentration, and 2,000 cps viscosity).

A package prepared by charging a pouch made of an oriented nylon (25μ)/non-oriented polypropylene (70μ) laminated film with 180 g each of said material to be sterilized was used to effect heating sterilization.

As a supporting holder for containing a package, one which is made from glass-filled silicone resin was used.

Temperatures of a package after heating were continuously measured by means of an optical fiber thermometer (3Z4D manufactured by Tateishi Denki) with respect to positions (2), (3), (5) and (6) in the positions (1)–(9) indicated in FIG. 10.

Packages were heated in such a way that each package passed repeatedly through two first heating parts five times, and then passed through one second heating part as well as two first heating parts one time. Temperatures of the packages thus heated were measured at the above respective positions, and the results thereof are indicated in FIG. 11.

In the above case, packages were conveyed in such a manner that two packages each were present in the respective heating parts.

As is apparent from FIG. 11, there were scarce temperature differences between the above-mentioned positions even after the elapse of 80 seconds from the start of irradiation in the present example, and a temperature difference of 20° C. or less was observed between the positions (3) and (2) at the time of completing such heating.

EXAMPLE 4

A supporting holder having a profile shown in FIG. 8(a) and made from glass-filled silicone resin was prepeared. A sample of the above supporting holder to which is attached a heating element was compared with another sample of said supporting holder without any heating element. As a heating element, aluminum deposited polyethylene terephthalate (a deposit thickness of 200 Å) was used, and the supporting holder provided with the heating element was further laminated with polyimide on the side of said deposit.

A pouch made of an oriented nylon film (25 μm)/a non-oriented polypropylene film (70 μm) was employed for a package A, and the package A was charged with 180 g of white sauce. Each of these packages A thus charged was heated by a sterilizing apparatus being provided with two first heating chambers to each of which an irradiation mouth of a waveguide extends from a microwave oscillator (SMG-130 manufactured by Sanyo Denki K.K.) having 1.3 KW output shown in FIG. 4 so as to be close to the underside of a conveyor and further provided with a second heating chamber onto the upper wall surface of which an irradiation mouth of another waveguide extends from the same type of microwave oscillator as that described above, and in the sterilizing apparatus, the packages A are continuously conveyed by means of a conveyor traversing these heating chambers. After the heat treatment, the temperatures at four positions A–D shown in FIG. 8(a) were continuously measured by means of an optical fiber thermometer (3Z4D manufactured by Tateishi Denki). Microwave irradiating conditions were 600 W output per a pouch, and a total heating time of 4 minutes. The heating sterilization was carried out in such that each package passed through said sterilizing apparatus for 2 minutes and 30 seconds, the heated package was then reversed once, and thereafter said package passed through said apparatus for 1 minute and 30 seconds. Finally, the positions B and D located at the underside of each package. Averages of the measured results are shown in Table 7.

TABLE 7

| Position | Maximum Arrived Temperature (°C.) | |
|---|---|---|
| | Example 4 | Comparative Example 1 |
| A | 136 | 137 |
| B | 133 | 133 |
| C | 135 | 124 |
| D | 140 | 112 |

As is apparent from Table 7, heat release at its surrounding portion where there is a sealed portion of each package was prevented by the use of the heating element, so that the whole package was substantially uniformly heated.

EXAMPLE 5

A supporting holder made of a silicone-impregnated glass-cloth laminate and having a profile as shown in FIG. 8(b) was prepared as the supporting holder used in the present example, and a silicone resin with which is admixed manganese-magnesium ferrite powder was prepared as the heating material for the present example. The supporting holder wherein the heating material has been attached to a holding plate on the side of the cover of said supporting holder (Example 5) was compared with the supporting holder without any heating material (Comparative Example 2).

A package A was composed of a molded tray prepared from polypropylene (500 μm)/saponified ethylene-vinyl acetate copolymer (50 μm)/polypropylene (500 μm) and a cover prepared from non-oriented nylon (15 μm)/polyvinylidene chloride (20 μm)/non-oriented polypropylene (70 μm). The molded tray was charged with 280 g of mixed vegetables, and then sealed hermetically with said cover to prepare a sample. The samples thus prepared were heated, and temperatures of which were measured by employing the same apparatus and implement with those of Example 4. Temperatures were measured at four positions A, B, C and D indicated in FIG. 8(b). Microwave irradiating conditions were 600 W output per a tray, and a total heating time of 6 minutes. The heating sterilization was carried out in such a manner that each package passed through said sterilizing apparatus for 4 minutes, the heated package was then reversed once, and thereafter said package passed through said apparatus for 2 minutes in such that a location of the cover of the package is finally at the underside thereof. The measured results are shown in Table 8.

TABLE 8

| Position | Maximum Arrived Temperature (°C.) | |
|---|---|---|
| | Example 5 | Comparative Example 2 |
| A | 132 | 133 |
| B | 141 | 123 |
| C | 134 | 136 |
| D | 125 | 125 |

As is apparent from Table 8, it was found that heat release from the cover side of each package could be prevented by the use of the heating material. Since the tray has a thick thickness, heat release therefrom is suppressed.

According to the process of the present invention, substantially homogeneous heating can be attained under such situation that there are slight temperature differences between respective portions in a package in the course of heat elevation of the package by means of microwave irradiation, besides there are also scarce temperature differences even at the time of completing the heating. Accordingly, homogeneous heating by means of microwave irradiation which could not have been realized in accordance with a conventional microwave irradiating process becomes possible in the process of the present invention.

Thus, it makes possible to reduce temperature scattering in a package in continuous microwave irradiating sterilization, besides deterioration in quality of foods can be prevented, and homogeneous heating becomes possible for a short period of time according to the process of the present invention.

We claim:

1. A process for sterilizing by microwave irradiation a material in a sealed microwave permeable package, said process comprising the steps of: placing said package into the cavity of a heat and pressure resisting support so that said package is maintained at a normal pressure and does not transfer heat to said support; conveying said support with said package therein through microwave irradiation areas; and alternately irradiating said package with local heating waveguides to locally irradiate the peripheral portions of said package and overall heating waveguides to irradiate the entire package, thereby effecting the substantially uniform heating of said material in said package.

2. The process claimed in claim 1, including the step of adjusting said local heating waveguides to a distance between 10 to 100 mm from said package prior to local irradiation.

3. The process claimed in claim 1, including the step of inverting said support with said package therein at least once during conveyance thereof so as to facilitate the substantially uniform heating of said material in said package.

4. The process claimed in claim 1, wherein said alternate irradiation commences with local irradiation with a local heating waveguide.

5. The process claimed in claim 1, wherein the irradiation with said local heating waveguides is effected from beneath said conveyor.

6. The process claimed in claim 1, wherein the local irradiation with said local heating waveguides is effected from both above and beneath said conveyor.

7. The process claimed in claim 1, wherein the local irradiation is accompanied by a plurality of local heating waveguides, each of said plurality of local heating waveguides being directed to a different location on said package.

8. The process claimed in claim 7, wherein said different locations are displaced along the direction of said conveying of said packages.

9. The process claimed in claim 7, wherein said different locations are displaced at locations spaced perpendicularly to said direction of said conveying of said package.

10. The process claimed in claim 1, wherein said support with said package are intermittently conveyed so as to be in a stopped position during local irradiation.

11. The process claimed in claim 1, wherein said local irradiation is accomplished by a plurality of local heating waveguides situated beneath said conveyor means, each of said local heating waveguides being directed at a different portion of said package.

12. The process claimed in claim 1, wherein said support with said package are conveyed through microwave irradiation chambers having overall heating waveguides, each microwave irradiation chamber having a volume within 0.05 m$^3$ to 0.5 m$^3$ so as to facilitate the substantially uniform heating of said material in said package.

13. The process claimed in claim 1, wherein said package is placed in a support having two supporting plates with a clearance between 0.5 to 3 mm therebetween so as to reduce the heat released through said clearance during irradiation of said material.

14. The process claimed in claim 1, including the step of providing a microwave heatable member in the cavity of said heat and pressure resisting support.

* * * * *